United States Patent

Akiyama

[15] 3,672,072
[45] June 27, 1972

[54] EDUCATIONAL DEVICE
[72] Inventor: Joseph S. Akiyama, Denver, Colo.
[73] Assignee: The Raymond Lee Organization, Inc., New York, N.Y.
[22] Filed: Dec. 11, 1970
[21] Appl. No.: 97,157

[52] U.S. Cl. ............................................................35/31 B
[51] Int. Cl. .....................................................G09b 19/02
[58] Field of Search......................35/30 R, 31 R, 31 B, 31 D, 35/31 F, 31 G, 32, 33

[56] References Cited

UNITED STATES PATENTS

| | | |
|---|---|---|
| 1,714,106 | 5/1929 | Ropke .........................................35/32 |
| 1,233,544 | 7/1917 | Bissey ....................................35/33 X |
| 3,352,487 | 11/1967 | Olson et al. .........................35/31 R X |

FOREIGN PATENTS OR APPLICATIONS

| | | |
|---|---|---|
| 262,017 | 1/1929 | Italy............................................35/32 |
| 997,441 | 7/1965 | Great Britain..........................35/31 B |

Primary Examiner—Wm. H. Grieb

[57] ABSTRACT

A rectangular hollow frame contains a plurality of spaced parallel coplanar rods. A plurality of flat coplanar discs are disposed individually rotatably around each rod. The discs are blank on one side and carry numbers on the other.

3 Claims, 5 Drawing Figures

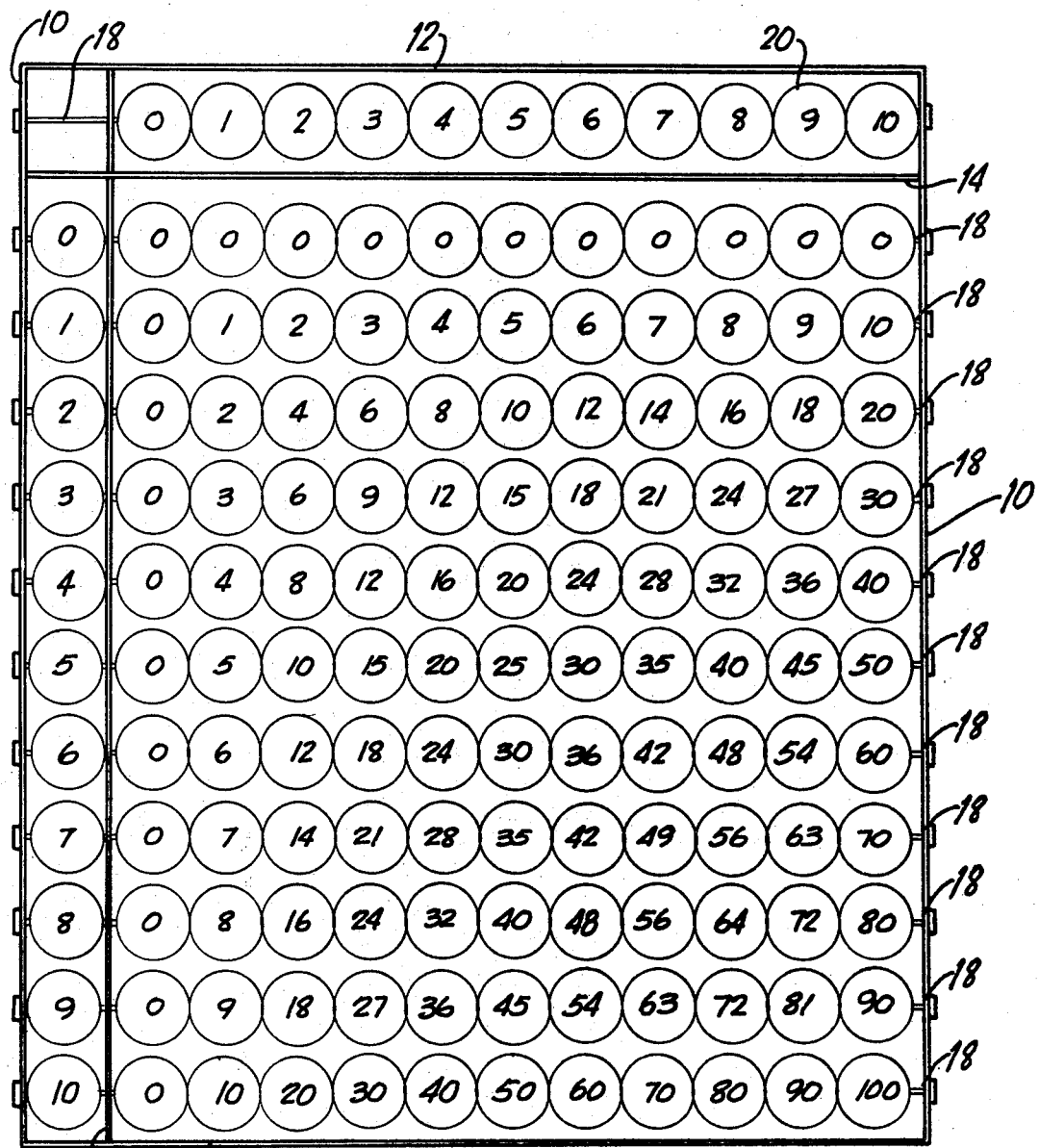
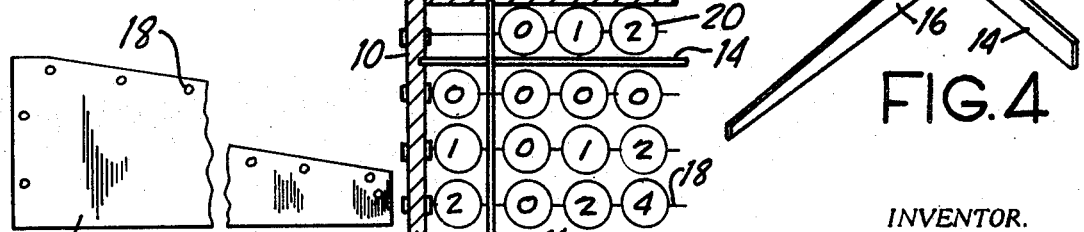
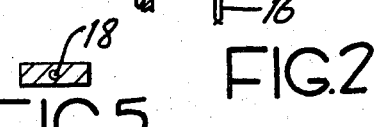
INVENTOR.
JOSEPH S. AKIYAMA

EDUCATIONAL DEVICE

SUMMARY OF THE INVENTION

My invention is an educational device adapted as a multi-purpose mathematics aid device used for example in teaching arithmetic.

My device comprises a hollow rectangular frame having a plurality of spaced parallel coplanar rods. Each rod contains a plurality of spaced coplanar discs, each individually rotatable about the rod to expose either one of two opposite faces. One face is blank, the other face carries a number. By suitably arranging the discs in the manner described below, an operator can discover or observe addition and subtraction relationships. By further disc manipulation, multiplication and division relationships can also be discovered or observed.

BRIEF DESCRIPTION OF THE DRAWINGS

In the drawings:
FIG. 1 is a plan view of my device;
FIG. 2 is a detail view thereof;
FIG. 3 is a broken side view thereof;
FIG. 4 is a detail view of certain parts used in my invention; and
FIG. 5 is a detail end view of one of the parts used in my invention.

DETAILED DESCRIPTION OF PREFERRED EMBODIMENTS

Referring now to FIGS. 1–5, two wedge-shaped parallel vertically elongated members 10 lying in parallel vertical planes are interconnected at opposite ends by two parallel elongated members 12 differing in width and lying in parallel vertical planes to define a hollow rectangular frame.

Members 10 are also interconnected by a member 14 parallel to members 12 and adjacent the top member 12 (as shown in the Figures). Members 12 are interconnected by a member 16 parallel to members 10 and adjacent the left hand member 10. Members 14 and 16 are notched to extend across each other as shown.

A first horizontal rod 18 disposed between members 12 and 14 and extending through member 16 is suspended between members 10. Disposed individually rotatably on rod 18 between member 16 and right hand member 10 are eleven spaced apart circular discs 20. Each disc has one side blank and the other sides of these discs carry numbers which increase sequentially from zero to 10. One or the other of these sides is always exposed.

Eleven additional parallel spaced coplanar rods 18 extend between members 10 and extend through member 16. Each rod carries 12 coplanar individually rotatable discs 20, blank on one side and numbered on the other. The first disc on each rod is disposed between left hand member 10 and member 16. The remaining 11 discs are disposed between member 16 and right hand member 10. All discs are positioned in the drawings to show the numbered side.

The second rod carries discs all having the number zero. The 12 discs on the third rod are numbered in sequence one, zero and then increase in sequence by units through 10. The first discs on each of the remaining nine rods increase by units from two to 10. The second discs in each of these nine rods all show zero. The third discs are the same as the corresponding first discs. The remaining discs on the third rod increase by units from two to 10; those on the fourth rod increase by twos from four to 20; those on the fifth rod increase by threes from three to 30; those on the sixth rod increase by fours from four to 40; those on the seventh rod increase by fives from five to 50; those on the eighth rod increase by sixes from six to 60; those on the ninth rod increase by sevens from seven to 70; those on the tenth rod increase by eights from eight to 80; those on the eleventh rod increase by nines from nine to 90; and those on the twelfth rod increase by tens from 10 to 100.

With all numbered discs facing upward and entering the entry numbers in the first rod and on the first discs on each of the other rods, the operator can observe or discover addition or subtraction relationships as the eye moves in one of four directions: left to right; right to left; top to bottom; and bottom to top.

Multiplication facts and their relationship to division may be learned by starting with all discs facing blank upward. The operator first learns the identity of each disc on the first rod and the first discs on each of the other rods and then rotates each disc on the first rod together with a corresponding first disc on another rod so that the numbers are exposed. As the eye follows the point at which the vertical column containing one exposed disc meets the horizontal row containing the other exposed disc, the disc at this point is rotated to show the product obtained by multiplying together the numbers on the other exposed discs. The division process is reversed in order of operation from multiplication which teaches a child the concept that division is the inverse of multiplication.

There are many variations possible for this device such as desk model size, table model size, different color schemes, and color arrangements. Numbers may be varied for other purposes in math by attaching capped numbers on the face of disks.

While I have described my invention with particular reference to the drawings, such is not to be considered as limiting its actual scope.

Having thus described this invention, what is asserted as new is:

1. A multi-purpose education device comprising
   a. a hollow, rectangular frame member inclusive of two outer wedge-shaped parallel side members and two outer end members, one of said end members being wider than the other and mounted on the wide ends of said side members to provide a sloped frame when lying flat;
   b. an inner end member secured between said side members and spaced inwardly from said wider end member;
   c. an inner, wedge-shaped side member mounted between said two outer end members with the wider end thereof mounted on said wider outer end member;
   d. said two inner members being crossed in said frame member;
   e. a plurality of coplanar rod members mounted between said two wedge-shaped outer side members and extending through said inner side member;
   f. a plurality of disc members rotatably mounted on each said rod forming longitudinal and lateral rows of disc members with a single disc on each such rod between said inner side member and the adjacent outer side member, separated from and in alignment with adjacent said disc members, said disc members being rotatable to expose either side thereof;
   g. a single rod member mounted between said outer side members and spaced between said inner end member and said wider, outer end member, and
   h. a plurality of disc members mounted on said single rod separated from and in alignment with adjacent rows of disc members on said coplanar rods.

2. A multi-purposed education device according to claim 1 wherein said single rod contains one less disc than on said coplanar rod members.

3. A multi-purpose education device according to claim 1 wherein said disc members have one blank side and the other side carries a number.

* * * * *